United States Patent [19]
Karvonen

[11] Patent Number: 5,753,080
[45] Date of Patent: May 19, 1998

[54] METHOD AND ARRANGEMENT FOR RECOVERING FIBER USING DISC FILTRATION

[75] Inventor: Vesa M. Karvonen, Lappeenranta, Finland

[73] Assignee: Ahlstrom Machinery Oy, Helsinki, Finland

[21] Appl. No.: 732,406
[22] PCT Filed: Apr. 27, 1995
[86] PCT No.: PCT/FI95/00232
§ 371 Date: Dec. 6, 1996
§ 102(e) Date: Dec. 6, 1996
[87] PCT Pub. No.: WO95/29747
PCT Pub. Date: Nov. 9, 1995
[51] Int. Cl.⁶ .................................................. D21F 1/66
[52] U.S. Cl. .................... 162/190; 162/189; 162/264; 210/928
[58] Field of Search .................... 162/189, 190, 162/264; 210/928

[56] References Cited

U.S. PATENT DOCUMENTS 5,290,454   3/1994   Dorica et al. ................ 210/710

FOREIGN PATENT DOCUMENTS 92959   12/1934   Sweden .
764836   1/1957   United Kingdom .

*Primary Examiner*—Donald E. Czaja
*Assistant Examiner*—Steven B. Leavitt
*Attorney, Agent, or Firm*—Nixon & Vanderhye P.C.

[57] ABSTRACT

In a method of recovering fibers from white water using a filter including a vat and a rotating filter surface (such as a disc filter), auxiliary pulp is supplied to the area of the vat where the cleaned and rotating filter surface meets the pulp surface in the vat. The consistency difference in the filter vat is adjusted by controlling the auxiliary pulp flow, or by adding cloudy filtrate to the auxiliary pulp prior to the filter vat. The auxiliary pulp is preferably supplied to the filter by using directing nozzles or other supply structures, and essentially evenly over the entire radial width of the filter surface.

16 Claims, 2 Drawing Sheets

METHOD AND ARRANGEMENT FOR RECOVERING FIBER USING DISC FILTRATION

BACKGROUND AND SUMMARY OF THE INVENTION

The invention relates to a method of recovering fibers from white water using a vat with a rotating filter surface movable into and out of the vat, typically disc filters.

The invention is described more in detail below as applied to the recovery of fines in the white water circulation of a paper machine. However, the invention may also be applied to other corresponding methods and systems.

The filters used in the recovery of fines from the white water circulation of a paper machine are mainly disc filters. These filters usually have a large number (e.g. six to thirty) of discs mounted on a horizontal shaft with the surface of the disc, which serves as the filtering surface, located essentially perpendicular to the center shaft of the filter. Vacuum is provided inside the disc by connecting the disc to the suction end of the filter. The screen surfaces are rotated while immersed in the mixture to be filtered. The pulp to be filtered is collected onto the filter surfaces and it is removed from the surface of the disc at a point above the surface of the pulp to be filtered.

In the feeding systems presently used, the fiber recovered from the white water and the auxiliary pulp, having longer fibers than the white water, are mixed in a static mixer prior to feeding the pulp to the supply vat of the disc filter. Long-fibered auxiliary pulp is mixed with the white water because the fines contained in the white water are so fine that it is difficult to separate them alone from the white water.

The feed consistency is controlled by a control circuit and the adjustment of the ratio of auxiliary pulp and white water aims at producing a mixture of normal feed consistency (approx. 0.6 to 1.3%) and the mixture is then filtered with the disc filter. The main part of the cumulative solids content of the filtrates is collected immediately following the beginning of the filtering process when no fiber layer has formed onto the filter wire to prevent passing of the fines through the wire. The filtrates obtained are divided in three fractions: very clear, clear, and cloudy filtrate.

The filtrates are commonly utilized so that the cloudy filtrate, which has the highest solids content, is recirculated to the supply of the filter, to be introduced with the white water and the auxiliary pulp. The clear filtrate is used in the detaching and washing jets of the filter and possibly also for the same purpose at a paper machine. The very clear filtrate is discharged from the process.

Prior art fiber recovering systems require high-capacity filters because the share of the recirculated cloudy filtrate is quite large. This also increases the amount of the auxiliary pulp required.

Finnish patent application no. 802528 discloses a fines recovery system. The characterizing feature of the system is that it comprises two separate filter apparatus interconnected by a flow duct. The first filter apparatus treats with a coating pulp, introduced from outside the system, either the cloudy filtrate received from the filter apparatus 8 and supplied together with the coating pulp and/or the clear filtrate received from the filter apparatus 6 or the cloudy filtrate supplied with the coating pulp and/or the clear filtrate received from the second filter apparatus; and the clear filtrate received from the second filter apparatus and supplied separately to the first filter. This means that the coating pulp brought to the fines recovery system comes at no stage in direct contact with the circulation water to be cleaned but the pulp is at first used in the treatment of the filtrate from the second filter apparatus in order to recover the fines in the filtrate.

According to the system of the publication, the thickened pulp received from the first filter apparatus and containing the fines recovered therein, is brought to the second filter apparatus to serve as the so-called auxiliary pulp. The whole volume of the circulation water to be treated, or at least a part of it, is supplied to the second filter apparatus with the pulp to be treated.

Thus, the system according to the publication does not instruct the reader to construct a fines recovering system which would specifically aim at minimizing the passage of the fines to the auxiliary pulp. The publication teaches the use of at least a part of the circulation water to be cleaned, for the dilution of the auxiliary pulp.

SE-A-92959 discloses a drum filter for recovering fine fibers from white water. Both the white water to be filtered and the fiber suspension for forming a filtering layer on the filter drum are brought into the filter apparatus from a separate mixing tank. In accordance with the SE document, the fiber suspension is diluted, if such is considered necessary, by means of adding white water to the fiber suspension. It has a disadvantage that the dilute white water carries also fine fibers which should be recovered by the apparatus. However, when such a diluted suspension is introduced onto the filter drum along with the fiber suspension the fine fiber fraction passes the openings of the filter drum and is taken out of the process along with the filtrate.

With our present invention this disadvantage, or problem, is solved by means of using cloudy filtrate for diluting the auxiliary pulp. Since cloudy filtrate is recovered from the portions of the filter sectors on which auxiliary pulp is introduced it contains only a negligible amount of fine fibers or no fibers at all but only some other solids we do not, practically speaking, loose any fibers in the filtrate taken out of the filter.

The present invention aims at avoiding also the other drawbacks mentioned above. Particularly, the invention intends to provide a new type of method and system of filtering fines, by means of which the filtering process is made more efficient. This in turn results in smaller pulp flows and thus less expensive apparatus sizes and smaller effluent volumes from the process.

The characterizing features of the invention are defined by the patent claims.

According to the invention, the filter surface used is first brought into contact with pulp having a higher consistency and a higher percentage of the auxiliary pulp, i.e. with pulp containing longer fibers, so that a filtering layer, i.e. a pulp layer having longer fibers than the fines, is formed of the auxiliary pulp onto the filter surface. Subsequently, the filter surface is moved towards the area in the filter vat containing more white water, whereby fines and other small particles are filtered to the fiber layer from the white water passing through the fiber layer containing longer fibers.

According to the method of the invention, auxiliary pulp and white water are preferably supplied to the filter vat separately and to a distance from each other so that a difference in consistency is created between different portions of the filter vat. The difference is adjustable by controlling the pulp flows. According to the invention the filter surface is moved, for example rotated, in the pulp to be filtered from the area of the highest consistency, i.e. from the area where the pulp contains more long-fibered pulp, towards the area containing pulp with more fines.

A disc filter is preferably used for carrying out the method. The auxiliary pulp is supplied to the area where the cleaned and rotating filter surface meets the pulp surface in the vat. Thus, a layer of pulp containing substantially longer fibers accumulates at first onto the filter surface and later the layer filters shorter fines. White water containing fines is preferably supplied to the opposite side of the filter surface in the vat, i.e. to the area from which the filter surface, while rotating, rises up from the vat. Thus, a pulp mixture, the fiber length distribution of which changes steplessly from the supply point of the auxiliary pulp to the supply point of the white water, is formed in the filter vat.

According to a prefered embodiment of the invention the long-fibered auxiliary pulp is supplied to the vat by means of directing nozzles so that it essentially spreads evenly over the whole radial width of the filter surface while the filter surface rotates.

Preferably, the consistency of the pulp and the difference in the consistency of the pulp at the opposite sides of the vat is adjusted by regulating the auxiliary pulp flow. The consistency in the higher consistency area, i.e. the area containing pulp with longer fibers, is preferably at its maximum the same as the consistency of the auxiliary pulp, e.g. of the order of 1% (solids content). The consistency at the opposite side of the vat containing pulp with more fines is at its minimum the same as the consistency of the white water, e.g. of the order of 0.4%. The consistency of the auxiliary pulp to be supplied to the vat is advantageously further adjusted by adding the cloudy filtrate from the disc filter to the auxiliary pulp prior to the filter vat.

According to the system of the invention for recovering fibers from the white water circulation of a paper machine, disc filters are employed whereby several disc-shaped filter surfaces are rotated around a horizontal shaft, in a vat containing a mixture of the white water to be filtered and auxiliary pulp. According to the invention, the supply point of the white water and the supply point of the auxiliary pulp are separate and located at a distance from each other in the vat so that areas of different concentration of white water and auxiliary pulp are established in the vat.

Preferably, the supply of the white water and the supply of the auxiliary pulp are located at different sides of the horizontal shaft rotating the disc-like filter surfaces, e.g. in the vicinity of the surface of the mixture to be filtered so that the mean fiber content of the mixture in the vat reduces in an essentially even or stepless way in the rotating direction of the filter surfaces from the supply point of the auxiliary pulp to the supply point of the white water.

The most significant advantage provided by the present invention is that when the disc that has been sprayed clean reaches the surface of the mixture in the vat the disc first comes in contact with pulp having a very low fines content. Thus, a layer of the auxiliary pulp containing longer fibres than the fines is formed onto the filter wire. The particles of the auxiliary pulp layer do not pass through the filter wire. When the filter disc rotates in the vat it reaches an area where the share of the white water in the mixture increases. The white water is now filtered through a fiber layer in which the layer facing the filter wire is made of the auxiliary pulp which does not allow passage of the fines or other small particles. Further, the filtering capacity remains linear almost through the whole filtering process because, while the process goes on, the consistency of the mixture to be filtered reduces all the time and in the end reaches the consistency of the white water.

Cleaner filtrates are received with the method and the system of the present invention since the cumulative solids content is lower than with prior art methods. This increases the possibilities to use the filtrates for other purposes in the process. Filters may be dimentioned smaller than today because the volume of the cloudy filtrate is smaller and the filtering curve (the filtrate volume as a function of time) remains linear also at the end of the filtering process due to the changing consistency. The volume of the auxiliary pulp required may be reduced, too.

The invention will be described by way of example in detail below with reference to the accompanying drawings of which

DETAILED DESCRIPTION OF THE DRAWINGS

Figure 1:
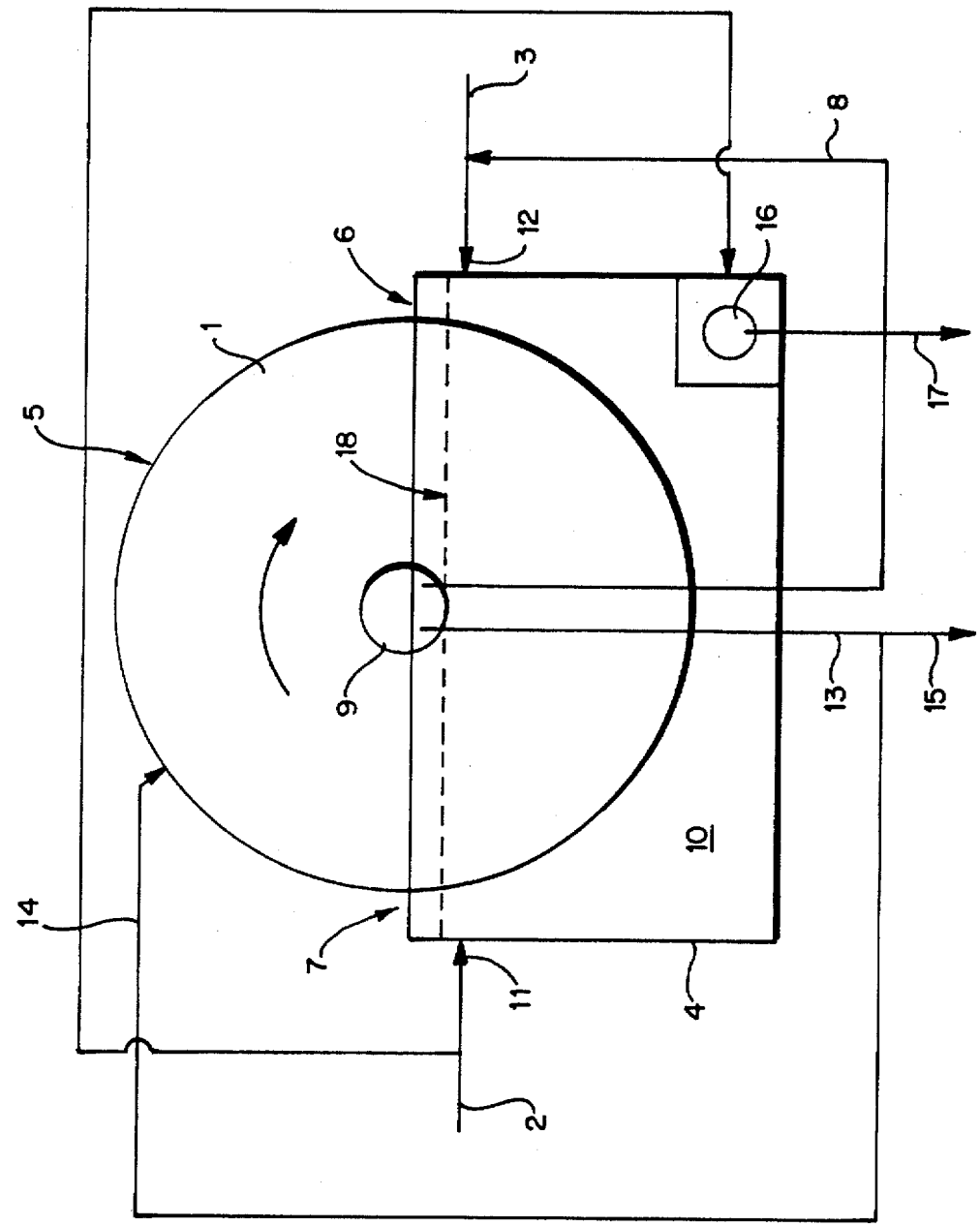
FIG. 1 illustrates schematically an arrangement according to the invention.

In the arrangement of FIG. 1, the disc filter 5 comprises filter surfaces 1 rotatable on a horizontal shaft 9 in a vat 4. White water 2 and auxiliary pulp 3 are supplied to the vat 4 as follows. A supply point 11 of white water is located in the vat in the rising range 7 of the filter surfaces 1, i.e. in the vicinity of the surface 18 of the mixture 10 by the other side of the vat. A supply point 12 of the auxiliary pulp is located by the other side of the vat 4, i.e. in the range 6 where the filter surfaces 1 submerge in the mixture to be filtered.

Thus the clean filter discs approaching the surface 18 of the mixture 10, at first come into contact with auxiliary pulp, mainly, which both has a higher consistency and contains longer fibers than the white water which consists mainly of very small particles. In this way a fiber layer is rapidly accumulated onto the surface of the filter cloth, preventing small particles from passing through to the filtrate. The consistency in the vat decreases in the rotating direction of the disc and thus the drainability is kept linear in spite of the growing fiber layer.

The cloudy filtrate 8 received from the system is returned to the process by mixing it in an appropriate proportion to the auxiliary pulp 3 prior to the supply point 12 of auxiliary pulp. As much of the clear filtrate 13 as needed is used for detaching pulp cakes and for washing 14 filter discs and the remaining portion 15 of the clear filtrate is discharged from the system.

White water 2 is also used as the water needed in the transport of the detached pulp cakes and as the water needed for the discharge screw 16. The thickened pulp 17 from the discharge screw of the filter is returned to the process, e.g. to a paper machine.

Figure 2:
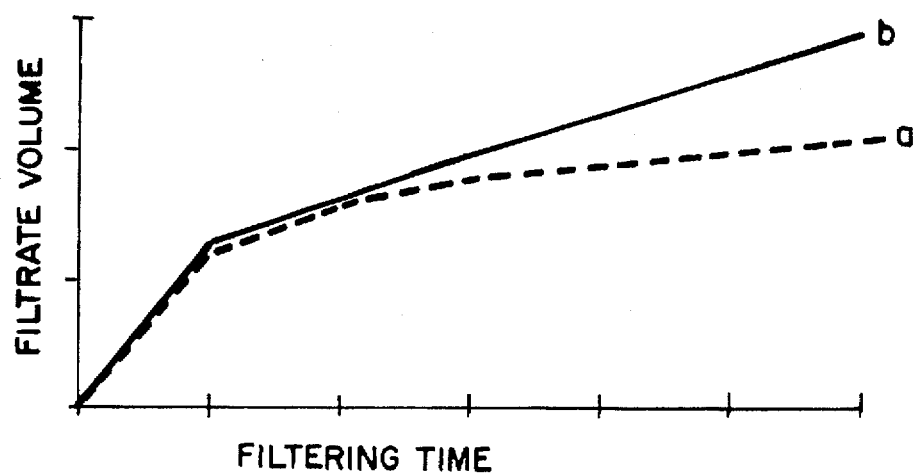
FIG. 2 illustrates the effect of the method of the invention on the drainability compared with prior art.

FIG. 2 illustrates the effect of the method of the invention on the drainability compared to prior art. Curve a illustrates filtering with prior art techniques. The curve shows that the filtering efficiency decreases with the growth of the pulp cake while the filtering proceeds when the feed consistency and the consistency in the filter vat are constant. Curve b illustrates the method of the invention according to which the increase in the filtering resistance caused by the accumulation of the pulp cake is compensated by the decrease in the consistency in the filter vat while the filtering proceeds and the disc sector travels towards the white water supply point.

Figure 3:
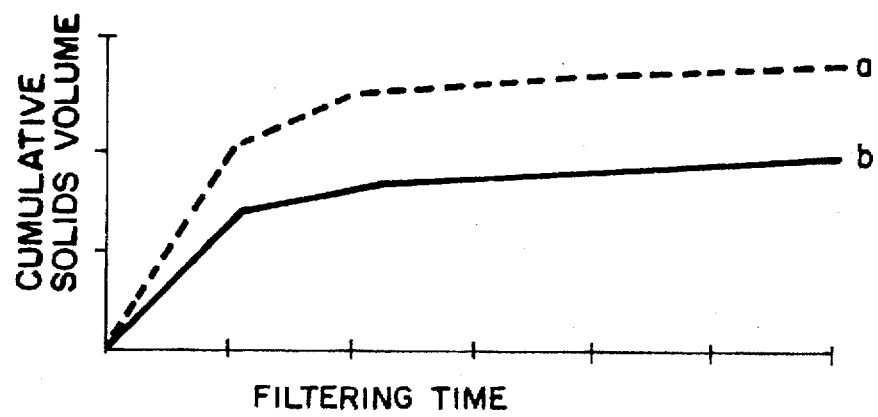
FIG. 3 illustrates the effect of the method of the present invention on the cumulative solids content of filtrates compared with prior art methods.

FIG. 3 illustrates the effect of the method of the invention on the cumulative solids content of the filtrates compared with prior art. Curve a illustrates the solids content of the cumulative filterates in prior art methods as a function of time. The curve shows that the main portion of the solids of the filtrates are collected at the beginning of the filtering process before a pulp cake has been formed onto the surface of the filter cloth. Curve b illustrates the solids amount in a method according to the invention. A fiber layer is formed onto the filter cloth of long-fibered auxiliary pulp containing remarkably less small particles than a conventional mixture of white water and auxiliary pulp. Thus the cumulative solids content of the filterates is remarkably lower than with prior art techniques.

While the invention has been described above by way of example only, and with reference to the accompanying drawing figures, various modifications thereof are possible without deviating from the inventive concept defined by the patent claims.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of recovering fibers from white water by means of a filter apparatus having a vat and a rotating filter surface in said vat, the filter surface in the vat being at first brought into contact with pulp having a higher consistency and containing more auxiliary pulp so that a filtering layer having longer fibers than the white water is formed of the auxiliary pulp onto the filter surface, and the filter surface is subsequently moved to an area in the vat containing more white water while the filtering layer filters the fines and other small particles from the white water, wherein the auxiliary pulp is not brought into contact with the white water until in the vat of the filter apparatus so that the auxiliary pulp is supplied to the area where the cleaned and rotating filter surface meets the pulp surface in the vat, wherein the consistency difference in the filter vat is adjusted by controlling the auxiliary pulp flow.

2. A method as claimed in claim 1, wherein the auxiliary pulp and the white water are supplied to a filter vat separately and to a distance from each other so as to provide an adjustable difference of consistency in the vat and so that the filter surface is moved in the pulp to be filtered from the area having the highest consistency, that is from the area having the highest auxiliary pulp content, towards the area containing more white water.

3. A method as claimed in claim 1, wherein the method employes a disc filter.

4. A method as claimed in claim 1, wherein the white water is supplied to the vat at the area from which the filter surface rises up from the vat.

5. A method of recovering fibers from white water by means of a filter apparatus having a vat and a rotating filter surface in said vat, the filter surface in the vat being at first brought into contact with pulp having a higher consistency and containing more auxiliary pulp so that a filtering layer having longer fibers than the white water is formed of the auxiliary pulp onto the filter surface, and the filter surface is subsequently moved to an area in the vat containing more white water while the filtering layer filters the fines and other small particles from the white water, wherein the auxiliary pulp is not brought into contact with the white water until in the vat of the filter apparatus so that the auxiliary pulp is supplied to the area where the cleaned and rotating filter surface meets the pulp surface in the vat, wherein the consistency of the auxiliary pulp flow is adjusted by adding cloudy filtrate to the auxiliary pulp prior to the filter vat.

6. A method as recited in claim 5 wherein the auxiliary pulp and the white water are supplied to a filter vat separately and to a distance from each other so as to provide an adjustable difference of consistency in the vat and so that the filter surface is moved in the pulp to be filtered from the area having the highest auxiliary pulp content towards the area containing more white water.

7. A method as recited in claim 6 wherein said method is practiced using a disc filter.

8. A method as recited in claim 7 wherein the white water is supplied to the vat at the area from which the filter surface rises up from the vat.

9. A method as recited in claim 5 wherein said method is practiced using a disc filter.

10. A method as recited in claim 5 wherein the white water is supplied to the vat at the area from which the filter surface rises up from the vat.

11. A method of recovering fibers from white water by means of a filter apparatus having a vat and a rotating filter surface in said vat, the filter surface in the vat being at first brought into contact with pulp having a higher consistency and containing more auxiliary pulp so that a filtering layer having longer fibers than the white water is formed of the auxiliary pulp onto the filter surface, and the filter surface is subsequently moved to an area in the vat containing more white water while the filtering layer filters the fines and other small particles from the white water, wherein the auxiliary pulp is not brought into contact with the white water until in the vat of the filter apparatus so that the auxiliary pulp is supplied to the area where the cleaned and rotating filter surface meets the pulp surface in the vat, wherein the auxiliary pulp is supplied by means of directing nozzles or supply means essentially evenly over the whole radial width of the filter surface.

12. A method as recited in claim 11 wherein the auxiliary pulp and the white water are supplied to a filter vat separately and to a distance from each other so as to provide an adjustable difference of consistency in the vat and so that the filter surface is moved in the pulp to be filtered from the area having the highest auxiliary pulp content towards the area containing more white water.

13. A method as recited in claim 12 wherein said method is practiced using a disc filter.

14. A method as recited in claim 13 wherein the white water is supplied to the vat at the area from which the filter surface rises up from the vat.

15. A method as recited in claim 11 wherein said method is practiced using a disc filter.

16. A method as recited in claim 11 wherein the white water is supplied to the vat at the area from which the filter surface rises up from the vat.

* * * * *